(12) United States Patent
Haapsaari et al.

(10) Patent No.: US 10,175,848 B2
(45) Date of Patent: Jan. 8, 2019

(54) DISPLAYING A DISPLAY PORTION INCLUDING AN ICON ENABLING AN ITEM TO BE ADDED TO A LIST

(75) Inventors: Joonas-Petteri Haapsaari, Tampere (FI); Kimmo Juhani Karimaki, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 12/367,885

(22) Filed: Feb. 9, 2009

(65) Prior Publication Data

US 2010/0205563 A1 Aug. 12, 2010

(51) Int. Cl.
*G06F 3/048* (2013.01)
*G06F 3/0482* (2013.01)
*G06F 3/0485* (2013.01)
*G06F 3/0488* (2013.01)

(52) U.S. Cl.
CPC .......... *G06F 3/0482* (2013.01); *G06F 3/0485* (2013.01); *G06F 3/04883* (2013.01)

(58) Field of Classification Search
CPC . G06F 3/0484; G06F 3/0481; G06F 17/30056
USPC ........................................ 715/730, 788, 825
See application file for complete search history.

(56) References Cited

U.S. PATENT DOCUMENTS

| | | | |
|---|---|---|---|
| 5,559,947 A * | 9/1996 | Wugofski | 715/837 |
| 6,121,968 A | 9/2000 | Arcuri et al. | |
| 6,307,548 B1 * | 10/2001 | Flinchem et al. | 715/811 |
| 6,466,237 B1 * | 10/2002 | Miyao et al. | 715/838 |
| D631,886 S * | 2/2011 | Vance et al. | D14/486 |
| D633,918 S * | 3/2011 | Vance et al. | D14/486 |
| 8,392,847 B2 * | 3/2013 | O'Shaugnessy | G06F 3/0485 715/785 |
| 9,317,190 B2 * | 4/2016 | Kwak | G06F 3/0484 |
| 2002/0029294 A1 * | 3/2002 | Ueno | H04L 41/0681 709/249 |
| 2002/0175950 A1 * | 11/2002 | Kuiken | G06F 11/321 715/785 |
| 2003/0137531 A1 * | 7/2003 | Katinsky et al. | 345/716 |
| 2004/0100479 A1 * | 5/2004 | Nakano et al. | 345/700 |
| 2004/0137882 A1 * | 7/2004 | Forsyth | H04L 12/1822 455/414.1 |
| 2005/0052427 A1 * | 3/2005 | Wu | G06F 3/04883 345/173 |
| 2006/0020904 A1 | 1/2006 | Aaltonen et al. | |

(Continued)

FOREIGN PATENT DOCUMENTS

CN 1458565 A 11/2003
CN 101627349 A 1/2010

(Continued)

OTHER PUBLICATIONS

International Search Report and Written Opinion for International Application No. PCT/IB2010/050563 dated Jun. 1, 2010.

(Continued)

*Primary Examiner* — Kevin L Young
*Assistant Examiner* — Haimei Jiang
(74) *Attorney, Agent, or Firm* — Alston & Bird LLP

(57) ABSTRACT

The disclosed embodiments are directed to displaying a portion of a list of items and selecting an icon in the list that when activated allows additional items to be added to the list.

24 Claims, 16 Drawing Sheets

(56) References Cited

U.S. PATENT DOCUMENTS

| | | | |
|---|---|---|---|
| 2006/0048076 A1* | 3/2006 | Vronay et al. | 715/850 |
| 2006/0075355 A1 | 4/2006 | Shiono et al. | |
| 2006/0123159 A1* | 6/2006 | Clow | G06F 3/0481 710/48 |
| 2006/0161868 A1* | 7/2006 | Van Dok | G06F 3/0481 715/835 |
| 2007/0035513 A1 | 2/2007 | Sherrard et al. | |
| 2007/0124677 A1* | 5/2007 | de los Reyes et al. | 715/705 |
| 2007/0164989 A1* | 7/2007 | Rochford et al. | 345/156 |
| 2007/0204235 A1* | 8/2007 | Gudi et al. | 715/774 |
| 2008/0130203 A1* | 6/2008 | Doberstein | F25D 29/005 361/601 |
| 2008/0320403 A1* | 12/2008 | Glaberson | 715/763 |
| 2009/0006454 A1* | 1/2009 | Zarzar et al. | 707/102 |
| 2009/0100360 A1* | 4/2009 | Janzen et al. | 715/764 |
| 2009/0249252 A1* | 10/2009 | Lundy et al. | 715/817 |
| 2009/0327960 A1* | 12/2009 | Dernis | 715/823 |
| 2010/0058193 A1* | 3/2010 | Sherrard et al. | 715/738 |
| 2010/0070853 A1* | 3/2010 | Holdaway | 715/243 |
| 2010/0191701 A1* | 7/2010 | Beyda et al. | 707/608 |
| 2011/0107264 A1* | 5/2011 | Akella | G06F 3/0482 715/830 |
| 2014/0304604 A1* | 10/2014 | Miyazawa | G06F 3/167 715/727 |

FOREIGN PATENT DOCUMENTS

| | | |
|---|---|---|
| EP | 1 586 984 A2 | 10/2005 |
| JP | H11-338611 A | 12/1999 |
| JP | 2003-131990 A | 5/2003 |
| JP | 2004-341603 A | 12/2004 |
| JP | 2006-134288 A | 5/2006 |
| JP | 2006-331256 A | 12/2006 |
| KR | 2003-008374 A | 11/2003 |
| KR | 2008-0025205 A | 3/2008 |
| WO | WO 2007/074067 A1 | 7/2007 |
| WO | WO 2008/082441 A1 | 7/2008 |
| WO | WO 2008/132539 A1 | 11/2008 |

OTHER PUBLICATIONS

Extended European Search Report from European Patent Application No. 10738272, dated Jun. 29, 2012.
Office Action for Japanese Application No. 2011-548837 dated Feb. 21, 2013.
Office Action for Chinese Application No. 201080007094.5 dated Jan. 29, 2013.
"*HTCTouch Diamond User Manual;*" HTC—Contacts; dated 2008; retrieved on Sep. 23, 2013 from <http://d14.htc.com/Web_materials/Manual/HTC_Touch_Diamond/HTC_Diamond_User_Manual_Asia WWE.pdf >.
"*Nokia 5800 XpressMusic User Guide;*" Nokia—Favorite Contacts; dated 2011; retrieved on Sep. 23, 2013 from <nds1.nokia.com/phones/files/guide/Nokia_5800_XpressMusic_UG_en.pdf>.
Office Action for Japanese Application No. 2011-548837; dated Jul. 24, 2013.
Office Action from corresponding Korean Application No. 2011-7021075, dated Jul. 24, 2014.
Office Action from corresponding Korean Application No. 2011-7021075, dated Nov. 25, 2014.
Office Action from corresponding Chinese Application No. 201080007094.5 dated Aug. 29, 2014.
Office Action from corresponding Taiwanese Application No. 99103800, dated Dec. 25, 2014.
European Search Report for Application No. EP 15 17 1953 dated Jul. 21, 2015.
Office Action for Korean Application No. 2011-7021075 dated Oct. 31, 2015.
Notice of Allowance for Korean Application No. 99103800 dated Oct. 28, 2015.
Office Action for Korean Application No. 10-2011-7021075 dated Jun. 29, 2016.
Office Action for Chinese Application No. 2015102942204 dated Jun. 14, 2018, 4 pages.
Office Action for European Application No. 15171953.1 dated Aug. 28, 2017, 4 pages.
Office Action for India Application No. 6437/DELNO/2011 dated Feb. 7, 2018, 6 pages.
Decision of Appeal for Japanese Application No. 2011-548837 dated Jan. 7, 2015, 13 pages.
Notice of Allowance for Chinese Application No. 201080007094.5 dated Mar. 16, 2015, 5 pages. (no translation available).
Notice of Acceptance for Australian Application No. 2010212007 dated Jan. 10, 2014, 2 pages.
Substantive Examination Report for Indonesian Application No. W-002011 03095 dated Apr. 18, 2013, 3 pages.
Office Communication for European Application No. 10 738 272.3 dated Mar. 3, 2015, 4 pages.
Decision to Refuse European Application No. 10 738 272.3 dated Apr. 2, 2015, 12 pages.
Office Action for Chinese Application No. 2015102942204 dated Aug. 14, 2017, 8 pages.

* cited by examiner

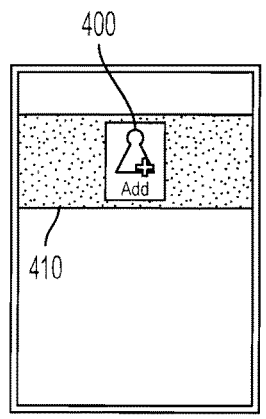
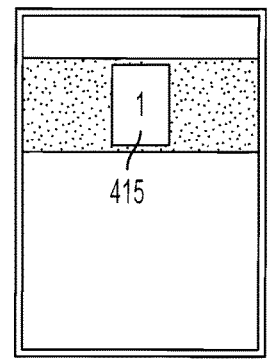
FIG. 4A  FIG. 4B
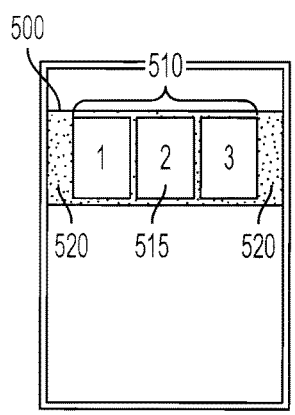
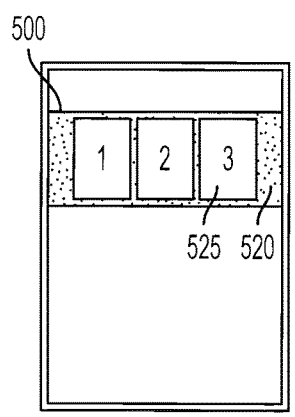
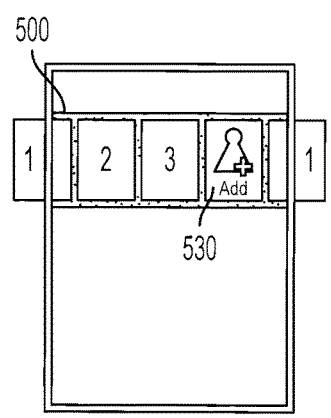
FIG. 5A  FIG. 5B  FIG. 5C

DISPLAYING A DISPLAY PORTION INCLUDING AN ICON ENABLING AN ITEM TO BE ADDED TO A LIST

BACKGROUND

1. Field

The aspects of the disclosed embodiments generally relate to displaying information and more particularly to displaying information in a carousel format.

2. Brief Description of Related Developments

Occasionally, when viewing items on a screen of an electronic device, the number of items to be displayed include too many to show on the screen at once. This situation may be aggravated as electronic devices become smaller and more portable and tend to have relatively small displays. In some instances, the items may be viewed by scrolling, that is, by moving some items presently in the field of view out of the field of view and replacing them with other items.

Some displays always include an additional icon that when selected provides a user with the ability to add an additional item. This may be undesirable if always displaying the additional icon results in crowding the screen, causes the size of other icons to be smaller than desired, or adds an icon that a user would rather not have displayed on the screen.

In some instances, displaying notifications related to items on the screen also causes undesirable crowding. Some of the present solutions include always displaying an event indicator on the item, which may partially block the item or generally detract from the display. In addition, a user may not want a constant reminder of the event notification.

These and other problems may be overcome by the embodiments disclosed herein.

SUMMARY

The disclosed embodiments are directed to a method including displaying a portion of a list of items and selecting an icon in the list that when activated allows additional items to be added to the list.

The embodiments also include an apparatus having a display configured to display a list of items, and a processor configured to provide scrolling to a selected portion of the list and configured to display an icon that when activated allows additional items to be added to the list.

The disclosed embodiments are also directed to a user interface including a display configured to display a list of items and an icon that when activated allows additional items to be added to the list, and a user interface configured to provide scrolling to a selected portion of the list, and configured to activate the icon.

BRIEF DESCRIPTION OF THE DRAWINGS

The foregoing aspects and other features of the embodiments are explained in the following description, taken in connection with the accompanying drawings, wherein:

FIGS. 4A and 4B illustrate an exemplary embodiment that enables adding a first item to an empty list of items;

FIGS. 5A-5C show an exemplary embodiment that includes displaying an indicator signifying that an "add items" icon is available;

DETAILED DESCRIPTION

Figure 1:
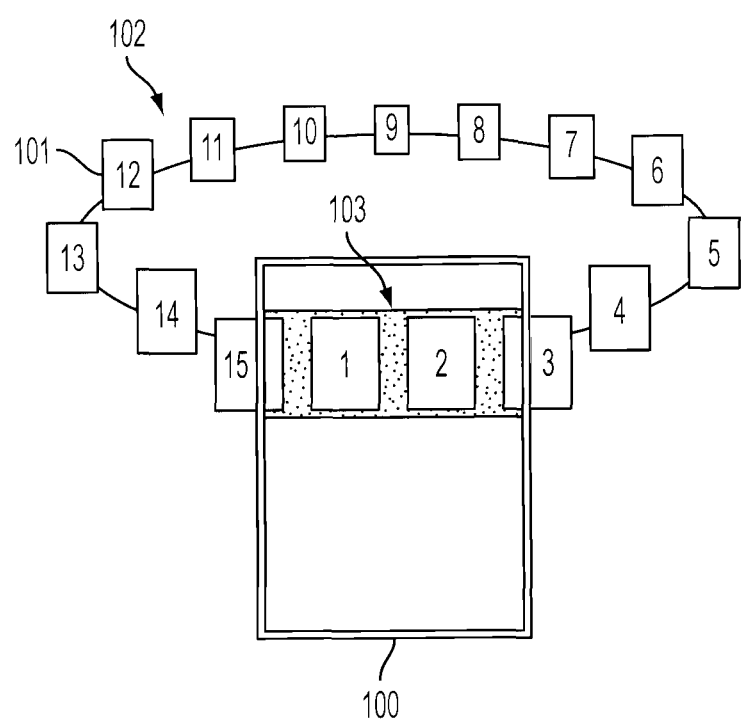
FIG. 1 shows an example of display of an exemplary carousel display technique according to the disclosed embodiments.

FIG. 1 shows an example of display 100 that demonstrates an exemplary carousel display technique. When a number of items 101 is too numerous to be displayed, the list of items 102 may be thought of as extending beyond the display in a ring. The items may be perceived conceptually as rotating around, similar to a carousel, with the display 100 acting as a window to a portion of the items. In this exemplary embodiment, the part of the display 103 showing the displayed items may be referred to as a ribbon or also as the uni-dimensional carousel mentioned above. In this example, when scrolling to the right past the last item, the first item appears and the items are repeatedly displayed in that order to the right. When scrolling in the opposite direction to the left past the first item to the last item, the second to last item appears and the items are repeatedly displayed in the opposite order to the left. While the disclosed embodiments will be described in the context of scrolling left and right, it should be understood that scrolling may occur in any first and second directions so long as the first scrolling direction is the opposite of the second scrolling direction.

The aspects of the disclosed embodiments generally provide for manipulation of a uni-dimensional list of items which may be in the form of graphical elements. The elements may be items portrayed on a display and may include, for example, files, folders, application shortcuts, browser bookmarks, contact information, images, video files, audio files including music, or other types of information, or groups of information. Upon selection of an item, that item is further selectable for actions such as displaying and selecting among menu selections, initiating an application including a browser, initiating a call to a contact, initiating a text message to a contact, displaying an image, playing an audio file, or any other suitable action.

The items may be displayed in a ribbon format that may be scrolled in the first or second directions and may be held stationary at any point in the list, allowing a user to selectively display items of interest. The embodiments include different scrolling options and different techniques for displaying an "add items" icon. The icon may be activated automatically or upon selection to allow for adding one or more items to the item list.

The disclosed embodiments also include displaying an indication that notifications may be present for one or more items in the item list and providing an option to scroll to items having notifications.

Figure 2:
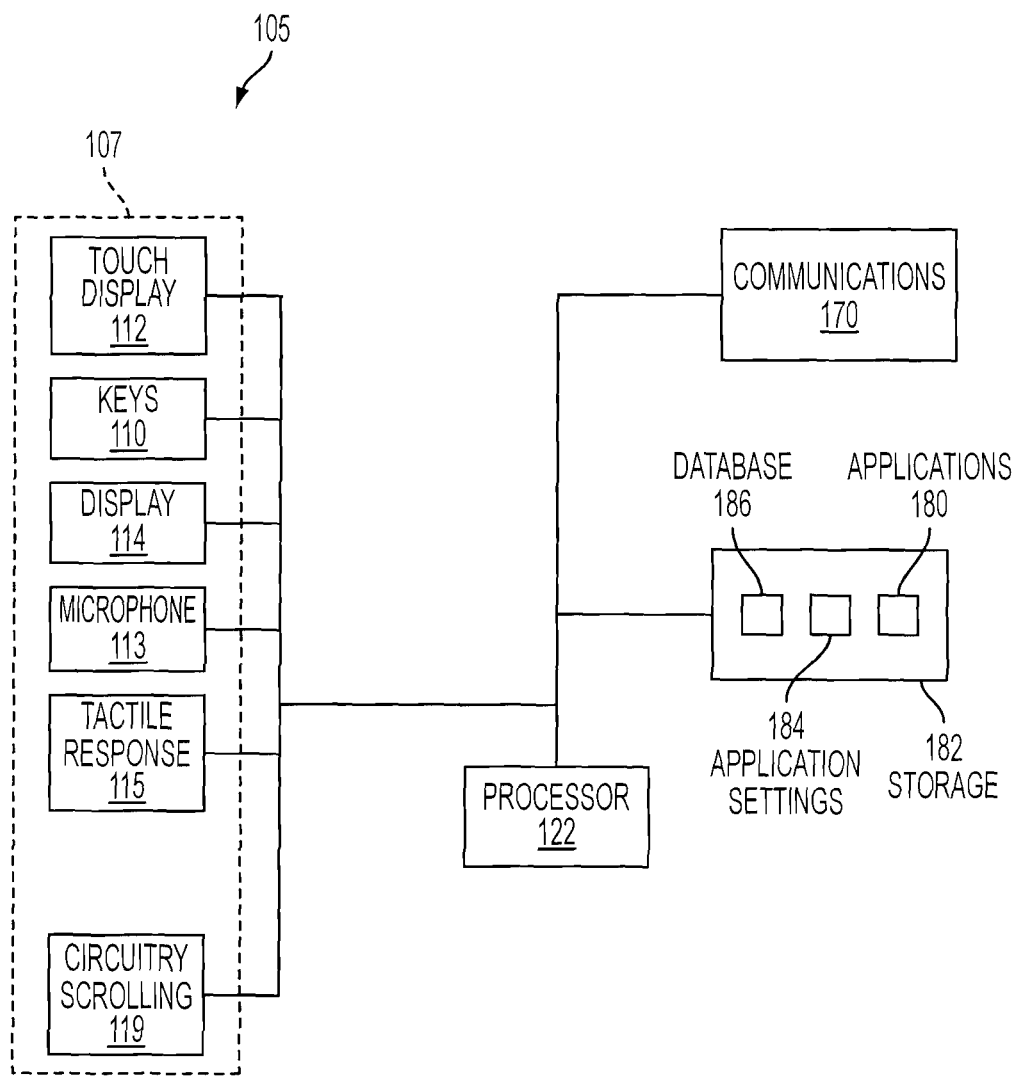
FIG. 2 shows a block diagram of a system in which aspects of the disclosed embodiments may be applied.

FIG. 2 illustrates one embodiment of a system 105 in which aspects of the disclosed embodiments can be applied. Although the disclosed embodiments will be described with reference to the embodiments shown in the drawings and described below, it should be understood that these could be embodied in many alternate forms. In addition, any suitable size, shape or type of elements or materials could be used.

Device 105 may be a portable device, for example, a portable personal computer or a mobile communications terminal, or may be a fixed device, for example, a terminal at a kiosk or a fixed communications terminal. Device 105 may be any suitable device, provided it includes a user interface capable of performing the operations described according to the disclosed embodiments. Device 105 may have a user interface 107, including at least one touch screen display 112 and scrolling circuitry 119. Device 105 may also include a processor 122, a storage device 182, and optionally a communications function 170. The components of device 105 may be implemented in any combination of hardware and software.

The user interface 107 of the disclosed embodiments may include input and output devices for interaction with one or more users. User interface 107 may include both touch and non-touch devices. Touch devices may include a touch screen or proximity screen device 112 which may be responsive to user input and may also include a display. In alternate embodiments, the aspects of the user interface 107 disclosed herein may be embodied on any suitable device that will display information and allow the selection and activation of applications, system content, and the functions of the embodiments described herein. The terms "select" and "touch" are generally described with respect to a touch screen-display. However, in alternate embodiments, the terms are also intended to encompass required user action with respect to other input devices.

For example, with respect to the touch/proximity screen device 112, it may not be necessary for a user to make direct contact with the touch/proximity screen device 112 in order to select an object, other information, or to initiate an application. The terms are intended to encompass that a user only needs to be within the proximity of touch/proximity screen device 112 to carry out the desired function, that is, the term "touch" in the context of the touch/proximity screen device 112, does not necessarily require direct contact, but may include near or close contact that activates the touch/proximity screen device 112. Similarly, the scope of the intended devices is not limited to single touch or contact devices. Examples of single and multi-touch operations may include a touchdown, where a user touches a particular part of the a screen of the touch/proximity screen device 112, a touch release, where a user ends contact with the touch/proximity screen 112, a move or a drag, where the user touches the touch/proximity screen 112 and moves while maintaining contact with the screen, a pinch, where the user touches the touch/proximity screen device 112 in two points and "drags" the two points together or apart, and a rotation, where the user touches the touch/proximity screen device 112 in two points and rotates the points. Any operations where contact or near contact by one or more fingers or other pointing devices can navigate on and about the screen are also intended to be encompassed by the disclosed embodiments.

Scrolling circuitry 119 may include sensors associated with touch display 112 for sensing single and multi-touch operations and causing items displayed on the touch screen to move accordingly. Scrolling circuitry 119 typically communicates with processor 122 and storage device 182 including applications 180 and application settings 184, described below.

"Non-touch" operations are also intended to be encompassed by the disclosed embodiments. Non-touch operations may include, but are not limited to, devices without touch or proximity screens. In some embodiments, non touch operations may include navigating or scrolling across a display or among items on the display by pressing hard or soft keys as part of the user interface 107 or by issuing voice commands. The user interface 107 may also include keys 110, for example, hard keys, soft keys, a keyboard, etc. for receiving user input, and a microphone 113 for receiving the voice commands. The user interface 107 may also include a tactile response device 115, for example, a vibrator, or other device that provides tactile feedback to the user as a user performs a non-touch, touch or multi-touch operation. For example, the tactile response device 115 may be built into the display and may cause a "press back" in the area touched by the user. In other examples, the tactile response device 115 may simply vibrate or may provide any other form of tactile response that presents a user with an indication that an input has been recognized.

The user interface 107 may also include one or more displays 114 which, as mentioned above, may be part of touch/proximity screen 112, or may be separate devices. The one or more displays generally provide information to a user including menus for selecting functions of the device 105.

Still referring to FIG. 2, the processor 122 operates to control the functions of the device 105. The processor may receive inputs, for example, signals, transmissions, instructions or commands related to the functions of the device 105 from user interface 107, scrolling circuitry 119, storage device 182, and communications function 170. The processor 122 interprets the inputs and controls the functions of the device 105 accordingly. In some embodiments, the processor 122 receives inputs from the user interface 107 related to selecting icons on the display 114, navigating menu structures, or otherwise making selections and initiating applications. In response, the processor 122 displays desired items on the display 114 and runs the requested applications. In particular, the processor may receive user input related to scrolling items on the display 112 and may control adding various items to or subtracting various items from the display as will be described below.

The processor 122, in combination with one or more of the user interface 107, scrolling circuitry 119, and programs in the storage device 182 may operate to sense when a number of items are too numerous to be displayed, when a user touches down on a portion of the user interface, or when a user presses one or more hard or soft keys. The processor 122, in combination with the other components, may also determine that the user is scrolling one or more displayed items in a direction, and may operate to automatically display the scrolling operation according to the disclosed embodiments.

Storage device 182 generally includes instructions or commands for the processor 122 related to the functions of the device 105. Storage device 182 includes computer readable media encoded with computer executable components, software, programs, instructions, commands, etc. for implementing the embodiments disclosed herein, in particular, operations related to scrolling items across touch display 112. Storage device 182 may utilize optical, magnetic, chemical, electrical, or any other suitable properties for receiving, storing, or delivering instructions and commands. Storage device 182 may include magnetic media, such as a diskette, disk, memory stick or computer hard drive, which is readable and executable by a computer. In other embodiments, storage device 182 may include optical disks, read-only-memory ("ROM") floppy disks and semiconductor materials and chips. Storage device 182 may generally utilize any suitable technology for implementing the embodiments disclosed herein.

Storage device 182 may also include applications 180 and application settings 184 for other functions, for example, data acquisition (e.g. image, video and sound), data processing (spread sheets, word processor, contact lists, currency converters, etc.), multimedia players (e.g. video and music players), various web services, and any other suitable applications. Storage device 182 may also include one or more databases 186 that include data, maps, contact information, or other information.

Communications function 170 may include circuitry and programs for providing any suitable communications tasks for implementing the disclosed embodiments. Communications function may include facilities for any type of satellite, mobile, wireless, wide area network, local area network, or public switched telephone network communications, or any other suitable communication facilities.

Figure 3A:
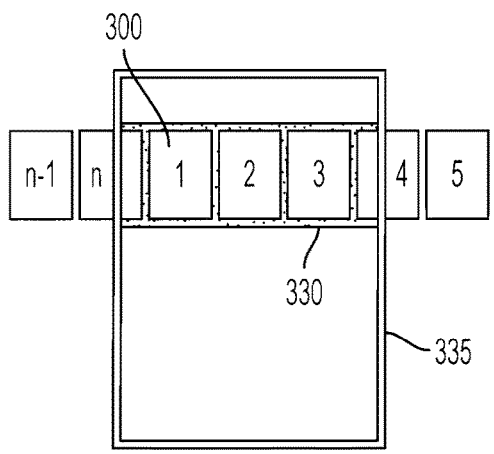
FIGS. 3A-3D show exemplary navigation techniques used in the disclosed embodiments.
Figure 3B:
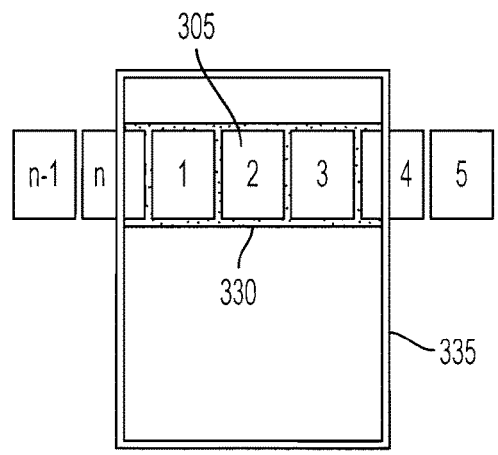
Figure 3C:
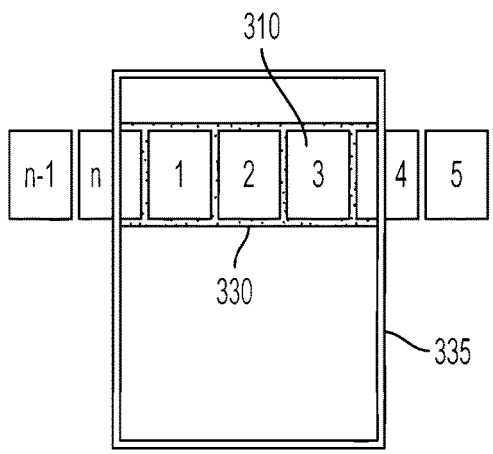
Figure 3D:
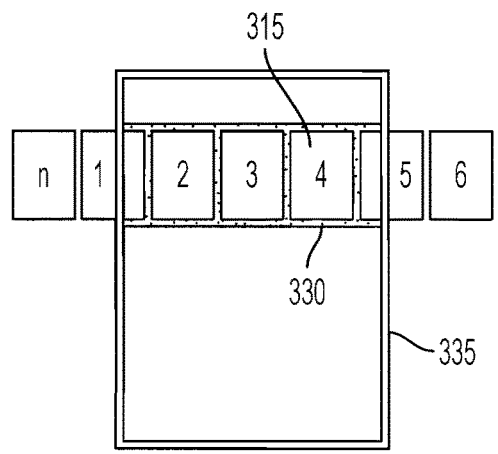

The embodiments may include displaying one or more items in a ribbon format. FIGS. 3A-3D illustrate examples of navigation across a ribbon 330 on a display 335. Navigation across the ribbon 330 may be accomplished by non touch operations, for example, by using soft or hard keys on user interface 107 (FIG. 2), or using touch operations, for example, by touching down and dragging an item. In FIG. 3A an item 300 may initially be selected. In FIG. 3B, a user may navigate right to select the next item 305 to the right. If the user continues to navigate to the right, item 310 may then be selected as shown in FIG. 3C. Still continuing to navigate to the right may result in selecting the next item to the right 315.

FIGS. 4A and 4B illustrate an exemplary embodiment that enables adding a first item to an empty list of items. An initial view may include an add items icon 400 in the ribbon 410, as shown in FIG. 4A.

In this and other embodiments, selecting the add items icon may generally provide a user with the ability to add an additional item to the item list. In some embodiments, selecting the add items icon may provide the user with the ability to add an additional item to the item list by selecting the item from a predefined collection of items. For example, in an embodiment where the item list is a list of favorite contacts, selecting the add items icon may generally allow a user to select one or more contacts from a company phone book and add them to the item list. In another embodiment where the item list includes images or music, selecting the add items icon may allow the user to select an image or song from a pre-defined collection or from a service that provides images or songs. In other embodiments, selecting the add items icon may provide a user with a form to fill out that may automatically populate different fields of information. In still other embodiments, selecting the add items icon may initiate a "wizard" that may provide an interactive guide to generating a new item or a selection process for selecting an item for the item list.

The disclosed embodiments may provide for selecting the add items icon using any suitable touch or non touch mechanism or technique. For example, a user may select the icon by touching down briefly or tapping the add items icon. In other embodiments, the user may use one or more hard or soft keys to select the add items icon.

As shown in the embodiment of FIG. 4B, once a contact 415 has been added to the item list, the add items icon may no longer be displayed.

Turning now to the embodiment of FIGS. 5A-5C, after a number of items have been added to the item list, one or more items 510 may be displayed in the ribbon 500. As shown in FIG. 5A, upon selection of an item 515 in the ribbon, an indicator 520 may be displayed on either end, or both ends of the one or more displayed items 510 signifying that the add items icon is available. As shown in FIG. 5B, when scrolling past the last item 525 in a direction toward an indicator 520, the add items icon 530 may be displayed as shown in FIG. 5C, and may be selected to perform operations to add an additional item to the item list. Note that items may be selected and scrolling may be accomplished using one or more of the selection.

Figure 6A:
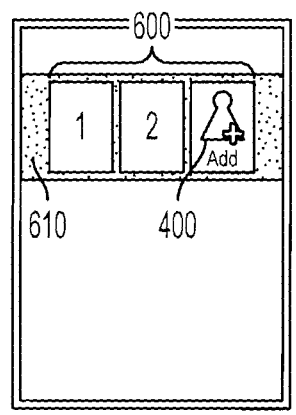
FIGS. 6A-6C illustrate another exemplary embodiment that includes partially displaying the add items icon on both ends of a number of displayed items.
Figure 6B:
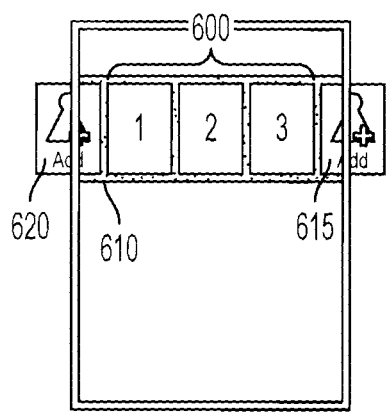
Figure 6C:
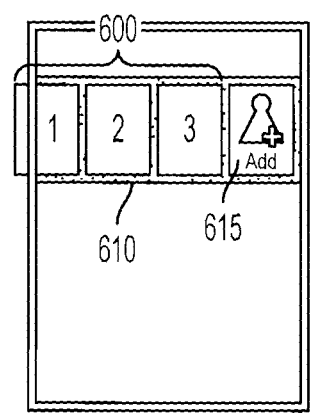

Returning to FIG. 4A, as mentioned above, an initial view may include an add items icon 400 in the ribbon 410. Turning to FIG. 6A, in another embodiment, the add items icon 400 may remain visible after adding one or more items 600 to the item list. In FIG. 6B, when the ribbon 610 is full, the one or more items 600 may be wholly displayed in the ribbon 610 and the add items icon 615, 620 may remain visible but may be partially displayed on both ends of the wholly displayed items 600. In FIG. 6C, upon selection of one of the add items icons, for example, icon 615, the items 600 are scrolled toward the opposite end until the add items icon 615 is wholly displayed. The add items icon 615 may be selected to perform operations to add an additional item to the item list. Upon completion, or upon performing other operations, the display may return to the configuration shown in FIG. 6B.

Figure 7A:
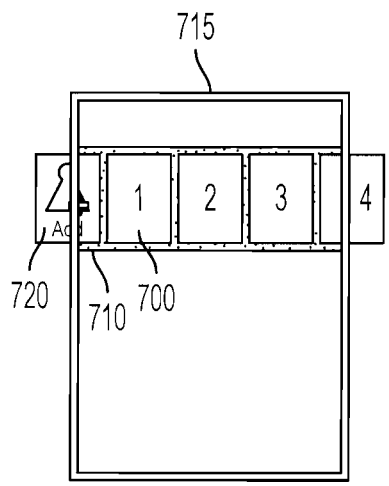
FIGS. 7A-7D show an exemplary embodiment which includes scrolling until a last item is wholly displayed and a partially visible add items icon is partially displayed.

FIG. 7A shows an exemplary embodiment which may include scrolling to the right until a last item 700 is wholly displayed in the leftmost whole position 710 on a display 715, and displaying a partially visible add items icon 720 to the left of the last item 700. Upon selection of the add items icon 720 the add items icon 720 may be scrolled to the leftmost position 710 as shown in FIG. 7B.

Figure 7B:
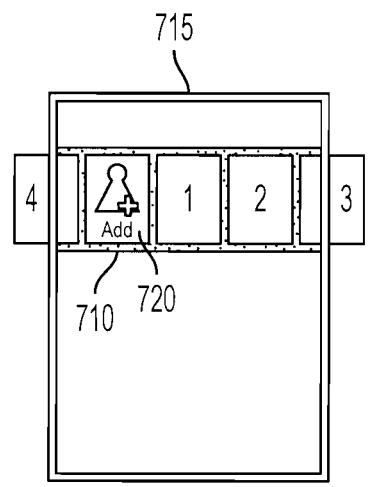

After the add items icon 720 has been scrolled to the leftmost position 710 in FIG. 7B, additional operations may commence to add an additional item to the item list either automatically, or upon another selection of the icon.

Figure 7C:
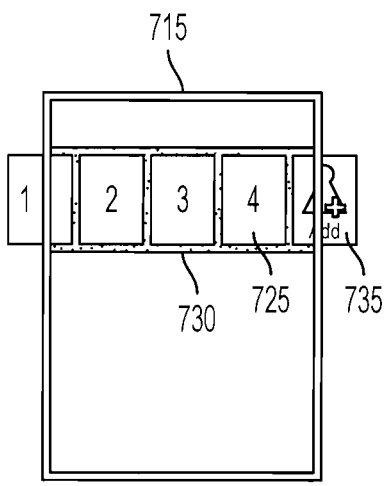
Figure 7D:
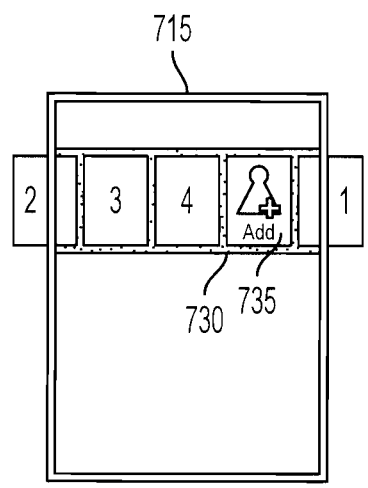

Another embodiment shown in FIG. 7C may include scrolling to the left until another last item 725 is wholly displayed in the rightmost position 730 on the display, and displaying a partially visible add items icon 735 to the right of the another last item 725. Upon selection of the add items icon 735 the add items icon 735 may be scrolled to the rightmost position 730 and additional operations may commence to add an additional item to the one or more items. In some embodiments, additional operations may only commence upon another selection of the add items icon.

Figure 8A:
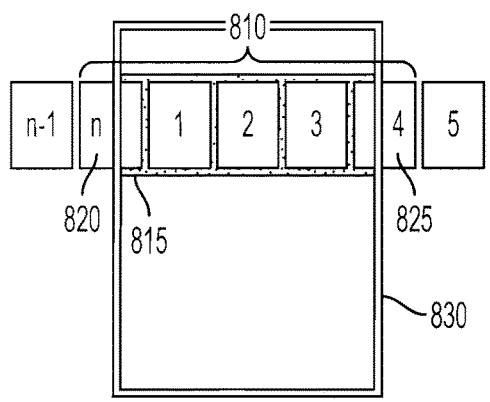
FIGS. 8A and 8B illustrate an exemplary embodiment where an add items icon may be partially displayed at an edge of a display.
Figure 8B:
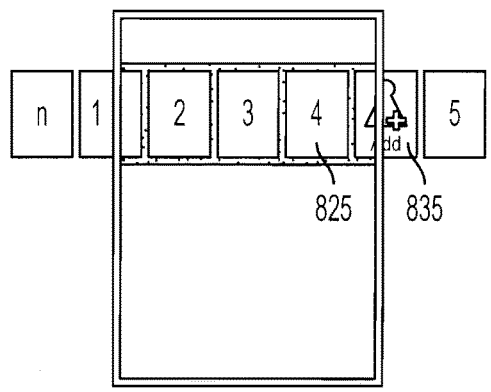

Still another exemplary embodiment is shown in FIGS. 8A and 8B. As shown in FIG. 8A, a number of items 810 may be displayed in the ribbon 815 including partially displayed items 820, 825 on one or both sides of the display 830. Upon scrolling to one of the partially displayed items, for example, item 825, the item 825 may be wholly displayed as shown in FIG. 8B and the add items icon 835 may be partially displayed in place of the item 825 now wholly displayed. The add items icon 835 may be selected to perform operations to add an additional item to the item list.

Figure 9A:
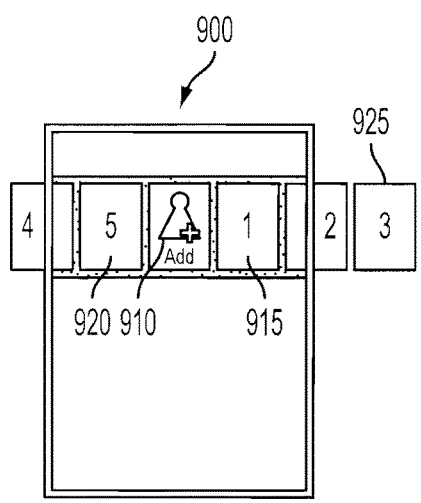
FIGS. 9A and 9B show another embodiment that includes inserting an add items icon between a first item and a last item.
Figure 9B:
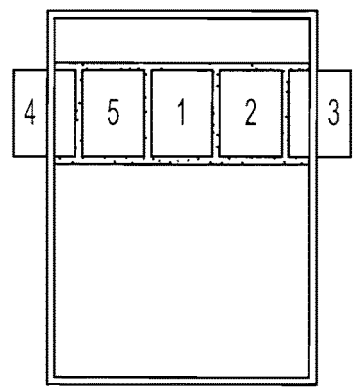

FIG. 9A shows another embodiment 900 that may include inserting the add items icon 910 between a first item 915 and a last item 920 in an item list 925. Upon scrolling to display the add items icon 910, the icon is removed if not selected within a specified period of time as shown in FIG. 9B. As mentioned above, scrolling and selecting may be accomplished using any touch or non touch technique. For example, a user may navigate and select among items in the item list 925 using one or more hard or soft keys of the user interface. A user may also touchdown on an item drag the item in a particular direction, and lift off while still moving. This may cause the items in the item list to scroll in the particular direction at a speed determined from a speed of the dragging motion. The items may continue to scroll until the add items icon 910 is displayed.

For each embodiment, in the event that a user fails to begin operations to add the additional item, the add items icon may be removed from the display or restored to its previous partially displayed position after a period of time.

Figure 10:
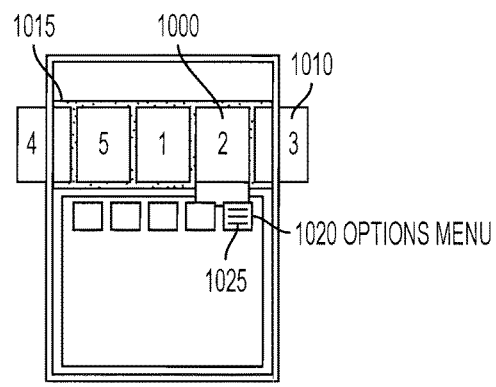
FIG. 10 illustrates an exemplary embodiment of a technique for removing an item from an item list.

Yet another exemplary embodiment as shown in FIG. 10 may include removing an item 1000 from the item list 1010. Upon selection of the item 1000 in the ribbon 1015, the selected item 1000 may be removed from the item list by operating a soft or hard key, performing a gesture, or a single touch or multi-touch operation. Optionally, selecting the item 1000 may open a menu 1020 of options for the item 1000. The menu 1020 may include a selection 1025 for removing the item 1000. In some embodiments, the menu 1020 may be opened by touching down and continuing to press on the item 1000.

Figure 11A:
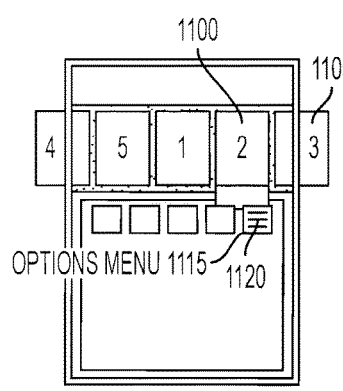
FIG. 11A-11D show an exemplary embodiment which provides for moving an item in an item list.
Figure 11B:
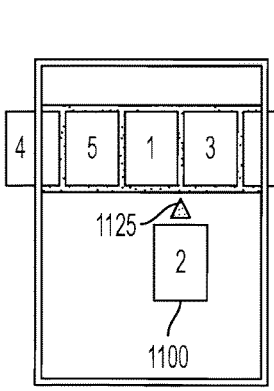
Figure 11C:
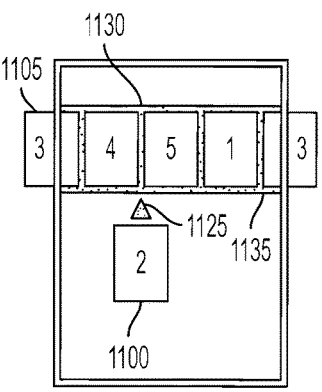
Figure 11D:
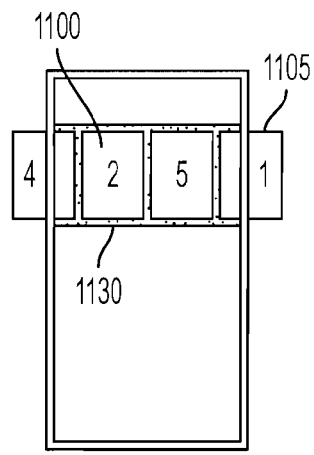

FIGS. 11A-11D illustrate typical operations for moving an item 1100 on the items list 1105. Referring to FIG. 11A, selecting the item 1100 may open a menu 1115 that may include a selection 1120 for moving the item 1100. In some embodiments, the menu 1115 may also be opened by touching down and continuing to press on the item 1100. As shown in FIG. 11B, selecting the menu selection 1120 causes the item being moved 1100 to be separated from the item list 1105. A marker 1125 may also be displayed, indicating where the item being moved 1100 may be placed. The user may move the marker 1125, or the item 1100 and marker 1125 together, by using non touch techniques including manipulating soft or hard keys on the user interface. The user may also move the marker 1125, or the item 1100 and marker 1125 by using touch operations, for example touching a desired position. FIG. 11C shows an exemplary desired position 1130 in the items list 1105. In this example, the user has moved the selected item 100 two positions to the left. The first move may move the item 1100 and marker 1125 one position to the left and the second move may cause the ribbon 1135 to scroll one position to the right. The user may then operate a soft or hard key, perform a gesture, a single touch, or a multi-touch operation to cause the item 1100 to be inserted into the ribbon at the desired location 1130 as shown in FIG. 11D.

Figure 12A:
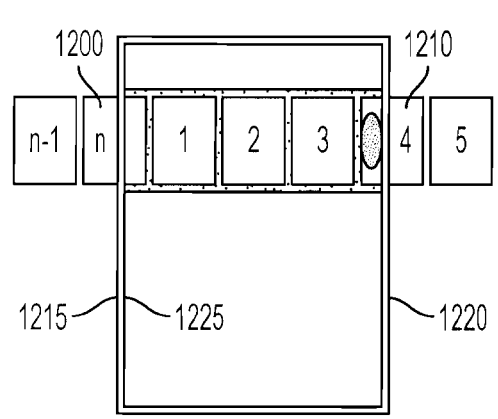
FIGS. 12A, 12B 13A-13D, and 14A and 14B show additional exemplary embodiments that provide for scrolling the item list.
Figure 12B:
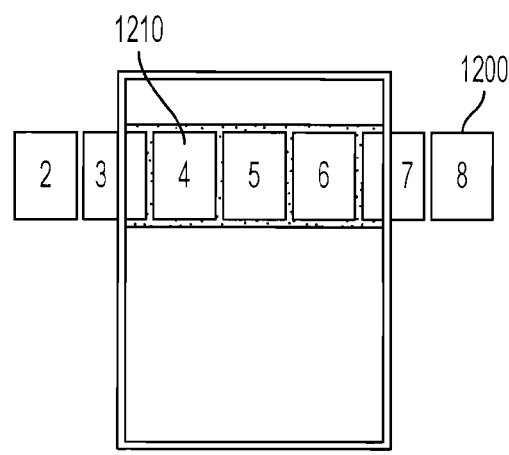

FIGS. 12A and 12B show yet another exemplary embodiment that provides for scrolling the item list 1200. The item list 1200 may be scrolled by a touch action, for example, by a touchdown, described above, on a partially displayed item 1210 at an edge of the screen 1215. In some embodiments, touching down on the partially displayed item 1210 at one edge 1220 of the screen 1215 may cause the item list 1200 to scroll towards the opposite edge 1225. As shown in FIG. 12B, the item list 1200 may scroll and stop when the touched item 1210 is wholly displayed at the opposite edge 1225. In other embodiments, touching down and continuing to press on the partially displayed item 1210 at one edge 1220 of the screen 1215 may cause the item list 1200 to scroll towards the opposite edge 1225 continuously until the user lifts off the screen 1215.

Figure 13A:
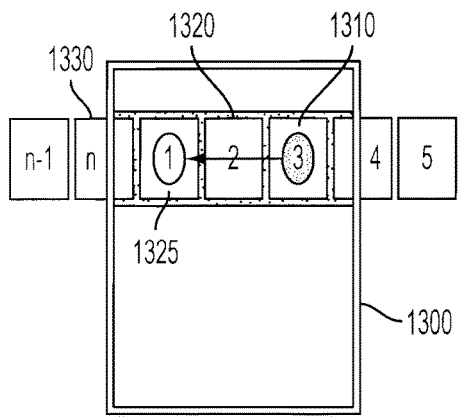
Figure 13B:
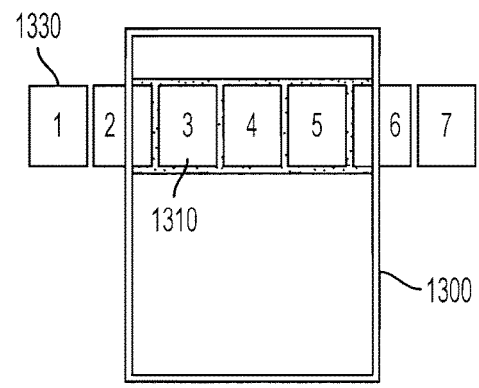
Figure 13C:
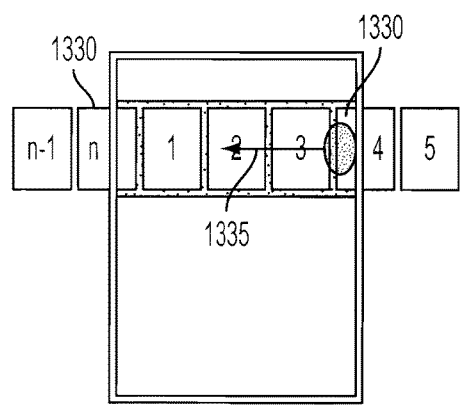
Figure 13D:
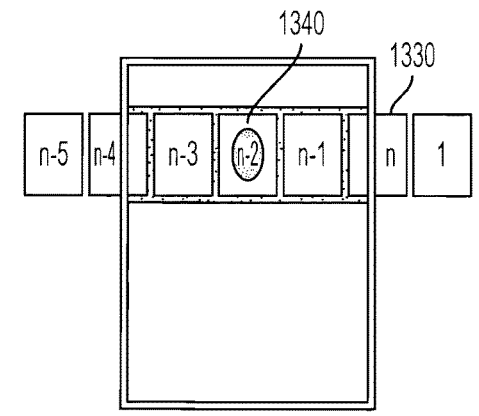

FIGS. 13A-13D show exemplary navigation techniques according to the disclosed embodiments. Referring to FIG. 13A, a user may execute a drag, explained above, by touching down on the display 1300 on an item 1310 in the ribbon 1320 and moving while maintaining contact with the display 1300. Upon reaching a desired position 1325, the user may stop moving and lift off the display. As a result all items in the item list 1330 may shift the same number of positions as item 1310 in the direction of the drag as shown in FIG. 13B. Turning to FIG. 13C, a user may also touchdown on an item 1330, drag the item in a particular direction 1335, and lift off while still moving. This may cause the items in the item list 1330 to scroll in the direction 1335 at a speed determined from a speed of the dragging motion. The items may continue to scroll and may not stop until the user touches down on an item 1340 in the ribbon 1330 as shown in FIG. 13D.

Figure 14A:
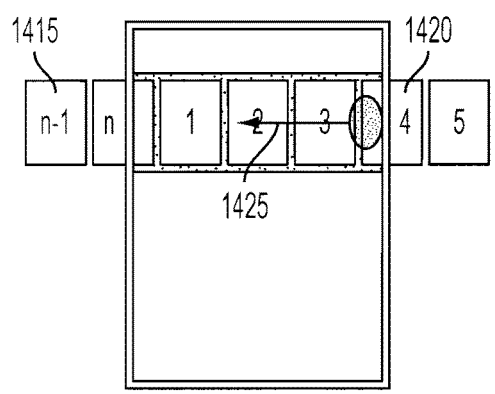
Figure 14B:
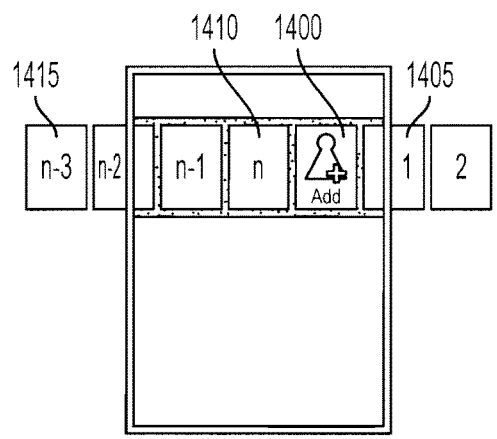

FIGS. 14A and 14B illustrate another embodiment that may include inserting the add items icon 1400 between a first item 1405 and a last item 1410 in an item list 1415. As shown in FIG. 14A, a user may also touchdown on an item 1420, drag the item in a particular direction 1425, and lift off while still moving. This may cause the items in the item list 1405 to scroll in the direction 1425 at a speed determined from a speed of the dragging motion. The items may continue to scroll until the add items icon 1400 appears after the last item 1410 in the item list 1415.

Figure 15:
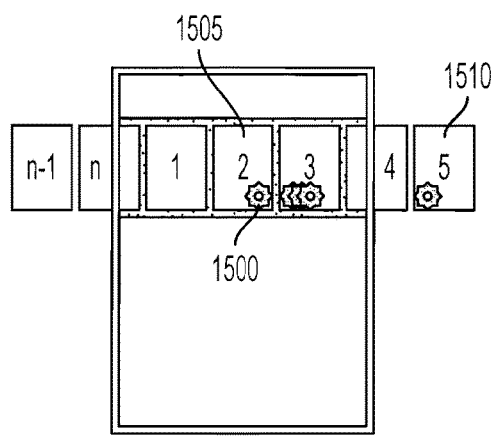
FIGS. 15, 16A, and 16B show an exemplary embodiment where a symbol indicates that an item has notifications.

The disclosed embodiments may also include displaying a notification. FIG. 15 shows an exemplary embodiment where a symbol 1500 is displayed as an overlay on an item 1505 in an item list 1510 that has one or more notifications. Notifications may generally include user alerts, including, without limitation, indications that a message or task may be pending related to the item, user interaction may be required for the item, or any other type of user alert. Selecting or touching a notification may cause the notification to be displayed.

Figure 16A:
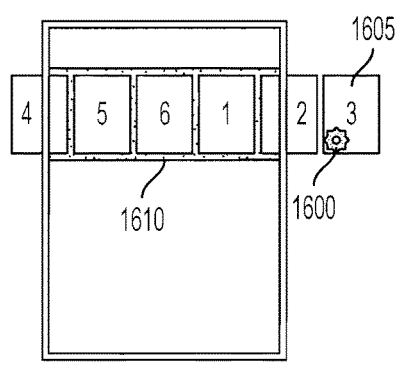
Figure 16B:
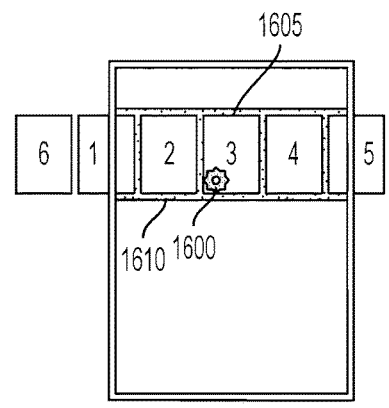

In some embodiments, the ribbon may be configured to automatically scroll to display an item having a notification. As shown in FIG. 16A, a notification 1600 has been received for an item 1605 that is outside the ribbon 1610. The ribbon 1610 may automatically scroll so that the item 1605 is visible in the ribbon 1610 as shown in FIG. 16B. The ribbon may always automatically scroll to the last item for which a notification has been received.

Figure 17A:
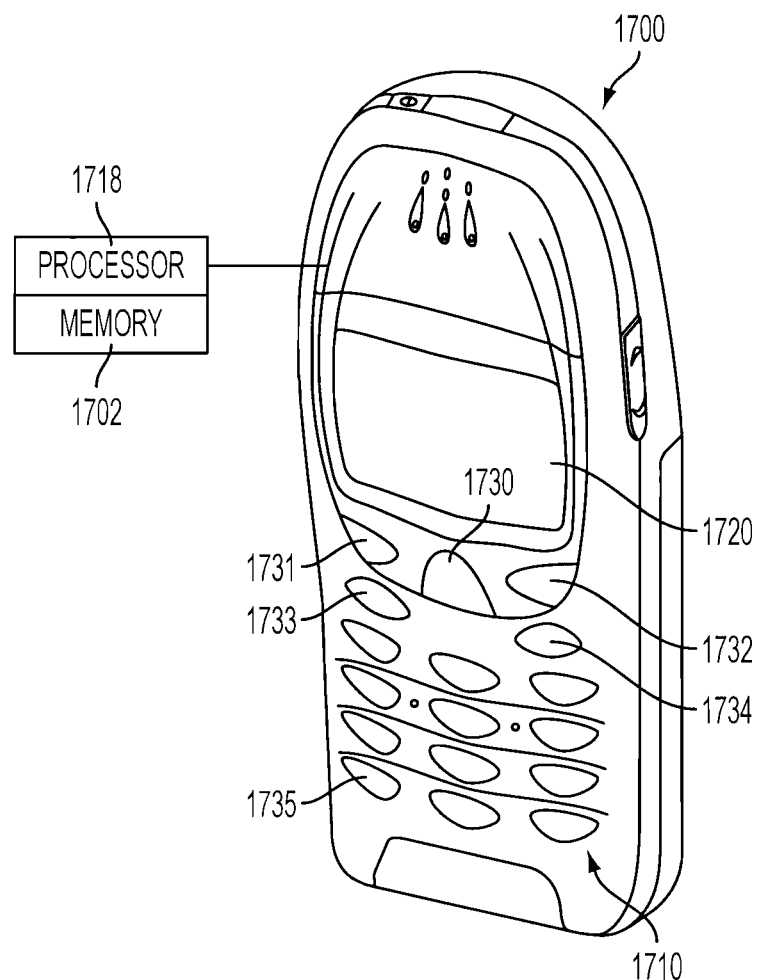
FIGS. 17A and 17B are illustrations of exemplary devices that can be used to practice aspects of the disclosed embodiments.
Figure 17B:
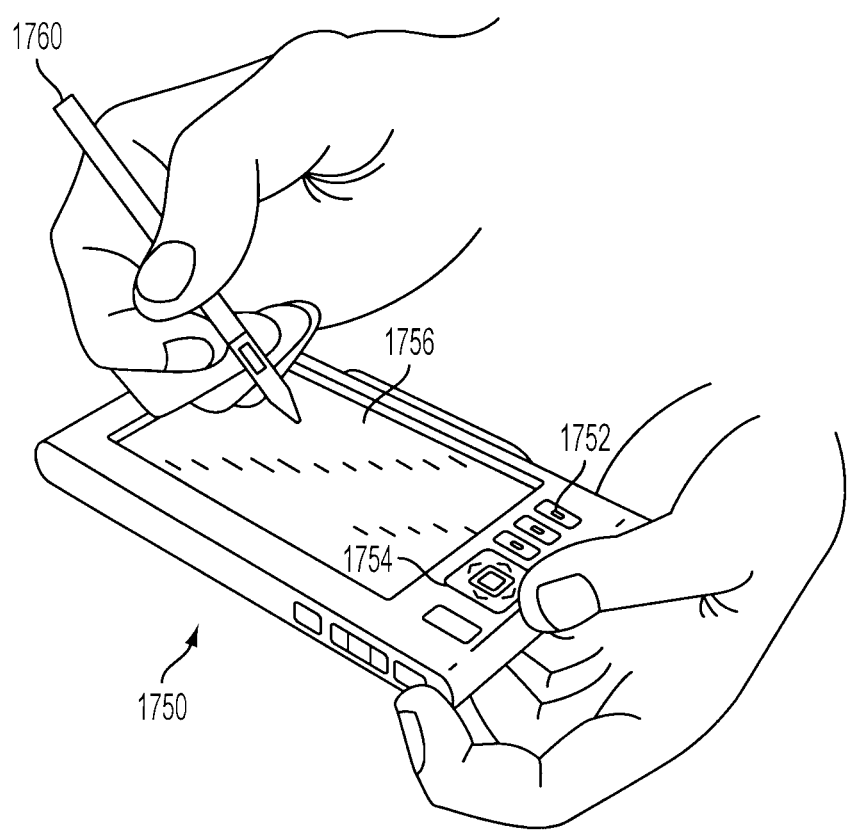

Some examples of devices on which aspects of the disclosed embodiments can be practiced are illustrated with respect to FIGS. 17A-17B. The devices are merely exemplary and are not intended to encompass all possible devices or all aspects of devices on which the disclosed embodiments can be practiced. The aspects of the disclosed embodiments can rely on very basic capabilities of devices and their user interface. Buttons or key inputs can be used for selecting the various selection criteria and links, and a scroll function can be used to move to and select item(s).

FIG. 17A illustrates one example of a device 1700 that can be used to practice aspects of the disclosed embodiments. As shown in FIG. 17A, in one embodiment, the device 1700 may have a keypad 1710 as an input device and a display 1720 for an output device. The keypad 1710 may include any suitable user input devices such as, for example, a multi-function/scroll key 1730, soft keys 1731, 1732, a call key 1733, an end call key 1734 and alphanumeric keys 1735. In one embodiment, the device 1700 can include an image capture device such as a camera (not shown) as a further input device. The display 1720 may be any suitable display, such as for example, a touch screen display or graphical user interface. The display may be integral to the device 1700 or the display may be a peripheral display connected or coupled to the device 1700. A pointing device, such as for example, a stylus, pen or simply the user's finger may be used in conjunction with the display 1720 for cursor movement, menu selection and other input and commands. In alternate embodiments any suitable pointing or touch device, or other navigation control may be used. In other alternate embodiments, the display may be a conventional display. The device 400 may also include other suitable features such as, for example a loud speaker, tactile feedback devices or connectivity port. The mobile communications device may have a processor 1718 connected or coupled to the display for processing user inputs and displaying information on the display 1720. A memory 1702 may be connected to the processor 1718 for storing any suitable information, data, settings and/or applications associated with the mobile communications device 1700.

Although the above embodiments are described as being implemented on and with a mobile communication device, it will be understood that the disclosed embodiments can be practiced on any suitable device incorporating a processor, memory and supporting software or hardware. For example, the disclosed embodiments can be implemented on various types of music, gaming and multimedia devices. In one embodiment, the system 105 of FIG. 2 may be for example, a personal digital assistant (PDA) style device 1750 illustrated in FIG. 17B. The personal digital assistant 1750 may have a keypad 1752, cursor control 1754, a touch screen display 1756, and a pointing device 1760 for use on the touch screen display 1756. In still other alternate embodiments, the device may be a personal computer, a tablet computer, touch pad device, Internet tablet, a laptop or desktop computer, a mobile terminal, a cellular/mobile phone, a multimedia device, a personal communicator, a television set top box, a digital video/versatile disk (DVD) or high definition player or any other suitable device capable of containing for example a display 114 shown in FIG. 2, and supported electronics such as the processor 1718 and memory 1702 of FIG. 17A. In one embodiment, these devices will be Internet enabled and include GPS and map capabilities and functions.

Figure 18:
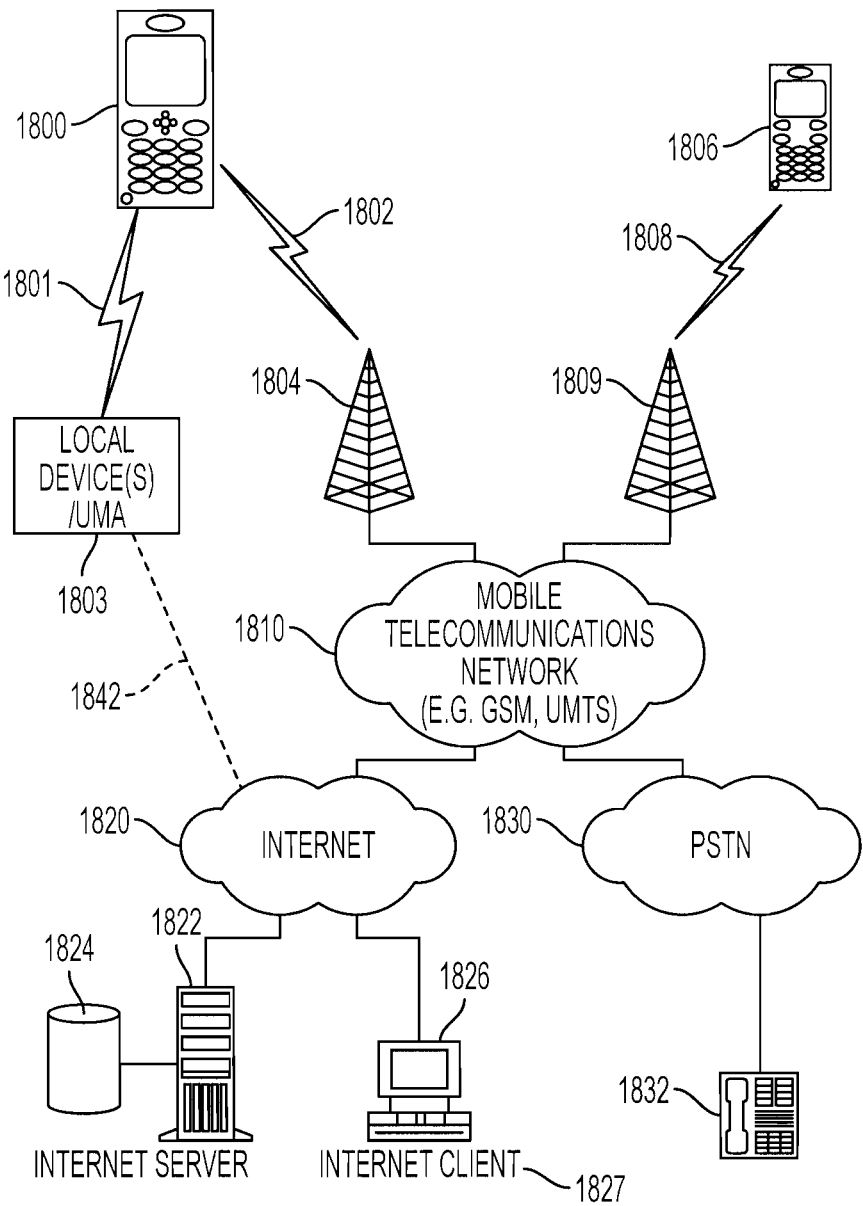
FIG. 18 illustrates a block diagram of an exemplary system incorporating features that may be used to practice aspects of the disclosed embodiments.

In the embodiment where the device 1700 comprises a mobile communications device, the device can be adapted for communication in a telecommunication system, such as that shown in FIG. 18. In such a system, various telecommunications services such as cellular voice calls, worldwide web/wireless application protocol (www/wap) browsing, cellular video calls, data calls, facsimile transmissions, data transmissions, music transmissions, multimedia transmissions, still image transmission, video transmissions, electronic message transmissions and electronic commerce may be performed between the mobile terminal 1800 and other devices, such as another mobile terminal 1806, a line telephone 1832, a personal computer 1826 and/or an internet server 1822.

In one embodiment the system is configured to enable any one or combination of chat messaging, instant messaging, text messaging and/or electronic mail. It is to be noted that for different embodiments of the mobile device or terminal 1700, and in different situations, some of the telecommunications services indicated above may or may not be available. The aspects of the disclosed embodiments are not limited to any particular set of services or communication, protocol or language in this respect.

The mobile terminals 1800, 1806 may be connected to a mobile telecommunications network 1810 through radio frequency (RF) links 1802, 1808 via base stations 1804, 1809. The mobile telecommunications network 1810 may be in compliance with any commercially available mobile telecommunications standard such as for example the global system for mobile communications (GSM), universal mobile telecommunication system (UMTS), digital advanced mobile phone service (D-AMPS), code division multiple access 2000 (CDMA2000), wideband code division multiple access (WCDMA), wireless local area network (WLAN), freedom of mobile multimedia access (FOMA) and time division-synchronous code division multiple access (TD-SCDMA).

The mobile telecommunications network 1810 may be operatively connected to a wide-area network 1820, which may be the Internet or a part thereof. An Internet server 1822 has data storage 1824 and is connected to the wide area network 1820, as is an Internet client 1827. The server 1822 may host a worldwide web/wireless application protocol server capable of serving worldwide web/wireless application protocol content to the mobile terminal 1800. The mobile terminal 1800 can also be coupled via link 1842 to the internet 1820. In one embodiment, link 1842 can comprise a wired or wireless link, such as a Universal Serial Bus (USB) or Bluetooth™ connection, for example.

A public switched telephone network (PSTN) 1830 may be connected to the mobile telecommunications network 1810 in a familiar manner. Various telephone terminals, including the stationary telephone 1832, may be connected to the public switched telephone network 1830.

The mobile terminal 1800 is also capable of communicating locally via a local link 1801 to one or more local devices 1803. The local link 1801 may be any suitable type of link or piconet with a limited range, such as for example Bluetooth™, a USB link, a wireless Universal Serial Bus (WUSB) link, an IEEE 802.11 wireless local area network (WLAN) link, an RS-232 serial link, etc. The local devices 1803 can, for example, be various sensors that can communicate measurement values or other signals to the mobile terminal 1800 over the local link 1801. The above examples are not intended to be limiting, and any suitable type of link or short range communication protocol may be utilized. The local devices 1803 may be antennas and supporting equipment forming a wireless local area network implementing Worldwide Interoperability for Microwave Access (Wi-MAX, IEEE 802.16), WiFi (IEEE 802.11x) or other communication protocols. The wireless local area network may be connected to the Internet. The mobile terminal 1800 may thus have multi-radio capability for connecting wirelessly using mobile communications network 1810, wireless local area network or both. Communication with the mobile telecommunications network 1810 may also be implemented using WiFi, Worldwide Interoperability for Microwave Access, or any other suitable protocols, and such communication may utilize unlicensed portions of the radio spectrum (e.g. unlicensed mobile access (UMA)).

Figure 19:
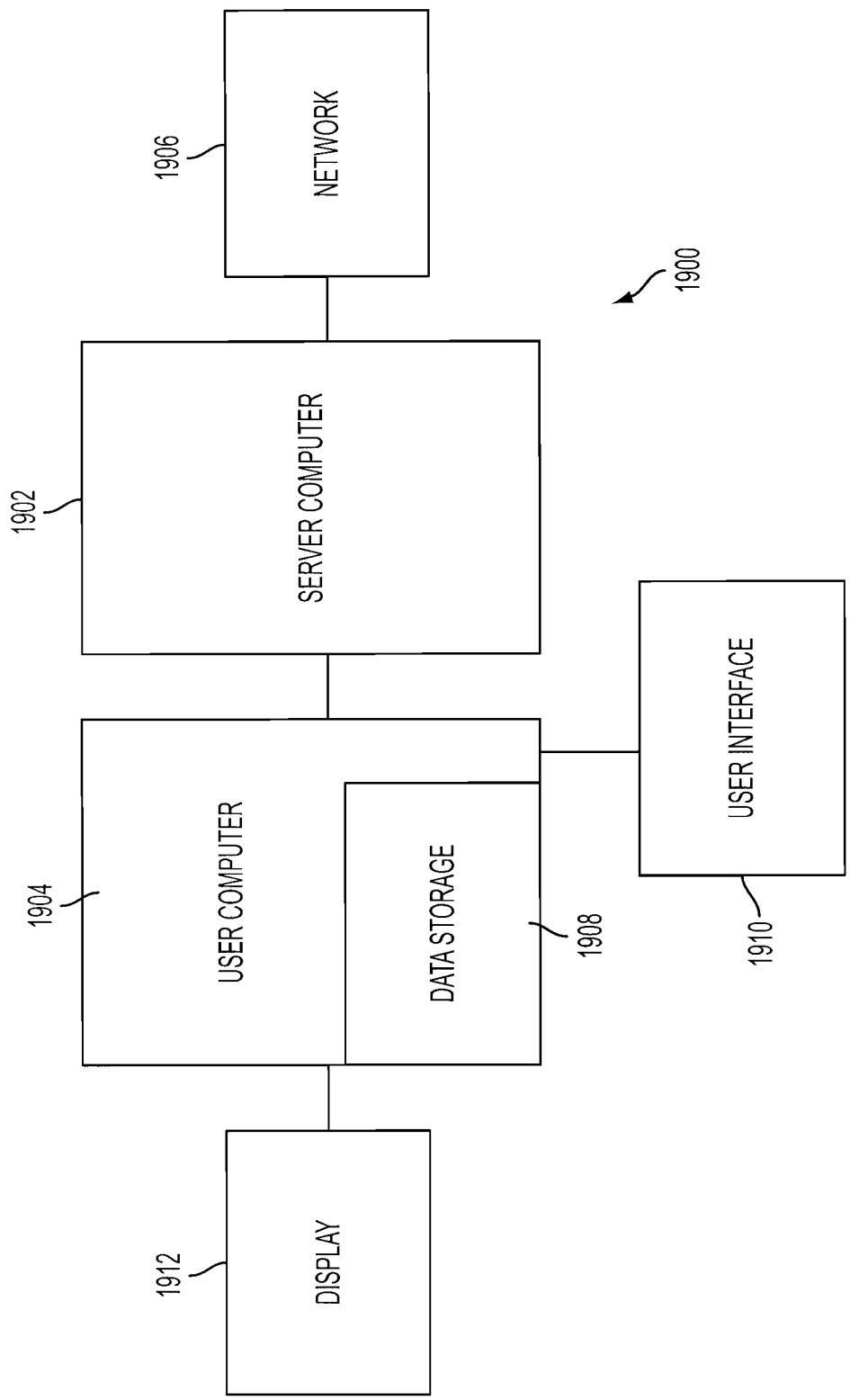
FIG. 19 is a block diagram illustrating the general architecture of an exemplary system in which the devices of FIGS. 17A and 17B may be used.

The disclosed embodiments may also include software and computer programs incorporating the process steps and instructions described above. In one embodiment, the programs incorporating the process steps described herein can be executed in one or more computers. FIG. 19 is a block diagram of one embodiment of a typical apparatus 1900 incorporating features that may be used to practice aspects of the invention. The apparatus 1900 can include computer readable program code means for carrying out and executing the process steps described herein. In one embodiment the computer readable program code is stored in a memory of the device. In alternate embodiments the computer readable program code can be stored in memory or memory medium that is external to, or remote from, the apparatus 1900. The memory can be direct coupled or wireless coupled to the apparatus 1900. As shown, a computer system 1902 may be linked to another computer system 1904, such that the computer systems 1902 and 1904 are capable of sending information to each other and receiving information from each other. In one embodiment, computer system 1902 could include a server computer adapted to communicate with a network 1906. Alternatively, where only one computer system is used, such as computer system 1904, computer system 1904 will be configured to communicate with and interact with the network 1906. Computer systems 1902 and 1904 can be linked together in any conventional manner including, for example, a modem, wireless, hard wire connection, or fiber optic link. Generally, information can be made available to both computer systems 1902 and 1904 using a communication protocol typically sent over a communication channel or other suitable connection or line, communication channel or link. In one embodiment, the communication channel comprises a suitable broad-band communication channel. Computers systems 1902 and 1904 are generally adapted to utilize program storage devices embodying machine-readable program source code, which is adapted to cause the computer systems 1902 and 1904 to perform the method steps and processes disclosed herein. The program storage devices incorporating aspects of the disclosed embodiments may be devised, made and used as a component of a machine utilizing optics, magnetic properties and/or electronics to perform the procedures and methods disclosed herein. In alternate embodiments, the program storage devices may include magnetic media, such as a diskette, disk, memory stick or computer hard drive, which is readable and executable by a computer. In other alternate embodiments, the program storage devices could include optical disks, read-only-memory ("ROM") floppy disks and semiconductor materials and chips.

Computer systems 1902 and 1904 may also include a microprocessor for executing stored programs. Computer system 1902 may include a data storage device 1908 on its program storage device for the storage of information and data. The computer program or software incorporating the processes and method steps incorporating aspects of the disclosed embodiments may be stored in one or more computer systems 1902 and 1904 on an otherwise conventional program storage device. In one embodiment, computer systems 1902 and 1904 may include a user interface 1910, and/or a display interface 1912 from which aspects of the invention can be accessed. The user interface 1910 and the display interface 1912, which in one embodiment can comprise a single interface, can be adapted to allow the input of queries, commands, and user interaction to the system, as well as present the results, as described with reference to FIGS. 1 through 16A and 16B, for example.

The aspects of the disclosed embodiments generally provide different techniques for manipulating a uni-dimensional list of items displayed in a ribbon format. The item list may be scrolled in different directions and may be held stationary at any point in the list, allowing a user to selectively display items of interest. The embodiments also include different techniques for displaying an add items icon, and for displaying an indication that notifications may be present for one or more items in the item list.

It is noted that the embodiments described herein can be used individually or in any combination thereof. It should be understood that the foregoing description is only illustrative of the embodiments. Various alternatives and modifications can be devised by those skilled in the art without departing from the embodiments. Accordingly, the present embodiments are intended to embrace all such alternatives, modifications and variances that fall within the scope of the appended claims.

The invention claimed is:

1. A method comprising:
    causing display of a portion of a list of items, wherein the portion of the list of items is displayed as a scrolling ribbon in which the items are positioned in an order relative to one another;
    determining that a notification has been received for at least one item that is included in the list of items prior to receipt of the notification but that is not in the portion of the list of items that is being displayed; and
    in response to determining that the notification has been received for the at least one of the list of items, automatically scrolling the list of items to a particular position so that the at least one of the list of items that has received the notification is visible in the display while maintaining the order of the items in the list with one or more items that are independent of a notification displayed in the list between the at least one of the list of items that has received the notification and another item of the list that is associated with a notification.

2. The method of claim 1, further comprising causing display of a symbol on an item that has the notification, the symbol being indicative of the notification.

3. A computer program product comprising at least one non-transitory computer-readable storage medium having computer-readable program instructions stored therein, the computer-readable program instructions comprising:
    program instructions configured to cause display of a portion of a list of items, wherein the portion of the list of items is displayed as a scrolling ribbon in which the items are positioned in an order relative to one another;
    program instructions configured to determine that a notification has been received for at least one item that is included in the list of items prior to receipt of the notification but that is not in the portion of the list of items that is being displayed; and
    program instructions configured to, in response to determining that the notification has been received for the at least one of the list of items, automatically scroll the list of items to a particular position so that the at least one of the list of items that has received the notification is visible in the display while maintaining the order of the items in the list with one or more items that are independent of a notification displayed in the list between the at least one of the list of items that has received the notification and another item of the list that is associated with a notification.

4. An apparatus comprising at least one processor and at least one memory storing computer program code, wherein the at least one memory and stored computer program code are configured, with the at least one processor, to cause the apparatus to at least:
- cause display of a portion of a list of items, wherein the portion of the list of items is displayed as a scrolling ribbon in which the items are positioned in an order relative to one another;
- determine that a notification has been received for at least one item that is included in the list of items prior to receipt of the notification but that is not in the portion of the list of items that is being displayed; and
- in response to determining that the notification has been received for the at least one of the list of items, automatically scroll the list of items to a particular position so that the at least one of the list of items that has received the notification is visible in the display while maintaining the order of the items in the list with one or more items that are independent of a notification displayed in the list between the at least one of the list of items that has received the notification and another item of the list that is associated with a prior notification.

5. The apparatus of claim 4, wherein the at least one memory and stored computer program code are configured, with the at least one processor, to further cause the apparatus to cause display of a symbol on an item that has a notification, the symbol being indicative of the notification.

6. A user interface comprising:
- a display configured to display a portion of a list of items, wherein the portion of the list of items is displayed as a scrolling ribbon in which the items are positioned in an order relative to one another; and
- a user interface controller configured to:
  - determine that a notification has been received for at least one item that is included in the list of items prior to receipt of the notification but that is not in the portion of the list of items that is being displayed; and
  - in response to determining that the notification has been received for the at least one of the list of items, automatically scroll the list of items to a particular position so that the at least one of the list of items that has received the notification is visible in the display while maintaining the order of the items in the list with one or more items that are independent of a notification displayed in the list between the at least one of the list of items that has received the notification and another item of the list that is associated with a notification.

7. The user interface of claim 6, wherein the display is configured to display a symbol on an item that has a notification, the symbol being indicative of the notification.

8. The method of claim 1, further comprising determining that a plurality of notifications are associated with a plurality of items of the list of items, and wherein the at least one of the list of items is associated with a most recent notification of the plurality of notifications.

9. The method of claim 1, wherein scrolling of the scrolling ribbon to the at least one item associated with the notification is performed in response to determining that the at least one of the list of items is located in a portion of the list of items outside of the display.

10. The method of claim 1, wherein the notification indicates that a pending message is related to the at least one of the list of items.

11. The computer program product of claim 3, further comprising program instructions configured to determine that a plurality of notifications are associated with a plurality of items of the list of items, and wherein the at least one of the list of items is associated with a most recent notification of the plurality of notifications.

12. The computer program product of claim 3, wherein scrolling of the scrolling ribbon to the at least one item associated with the notification is performed in response to determining that the at least one of the list of items is located in a portion of the list of items outside of the display.

13. The computer program product of claim 3, wherein the notification indicates that a pending message is related to the at least one of the list of items.

14. The computer program product of claim 3, wherein the instructions further comprise program instructions configured to display a symbol on an item that has a notification, the symbol being indicative of the notification.

15. The apparatus of claim 4, wherein the apparatus is further caused to determine that a plurality of notifications are associated with a plurality of items of the list of items, and wherein the at least one of the list of items is associated with a most recent notification of the plurality of notifications.

16. The apparatus of claim 4, wherein scrolling of the scrolling ribbon to the at least one item associated with the notification is performed in response to determining that the at least one of the list of items is located in a portion of the list of items outside of the display portion.

17. The apparatus of claim 4, wherein the notification indicates that a pending message is related to the at least one of the list of items.

18. The user interface of claim 6, wherein the user interface controller is further configured to determine that a plurality of notifications are associated with a plurality of items of the list of items, and wherein the at least one of the list of items is associated with a most recent notification of the plurality of notifications.

19. The user interface of claim 6, wherein scrolling of the scrolling ribbon to the at least one item associated with the notification is performed in response to determining that the at least one of the list of items is located in a portion of the list of items outside of the display.

20. The user interface of claim 4, wherein the notification indicates that a pending message is related to the at least one of the list of items.

21. The method of claim 1, wherein the at least one of the list of items that is associated with a most recent notification and one or more items that are independent of the notification are visible in the display while the item of the list that is associated with a prior notification is outside of the display.

22. The computer program product of claim 3, wherein the at least one of the list of items that is associated with a most recent notification and one or more items that are independent of the notification are visible in the display while the item of the list that is associated with a prior notification is outside of the display.

23. The apparatus of claim 4, wherein the at least one of the list of items that is associated with a most recent notification and one or more items that are independent of the notification are visible in the display while the item of the list that is associated with a prior notification is outside of the display.

24. The user interface of claim 6, wherein the at least one of the list of items that is associated with a most recent notification and one or more items that are independent of the notification are visible in the display portion while the item of the list that is associated with a prior notification is outside of the display.

* * * * *